US011763361B2

(12) United States Patent
Gabriele et al.

(10) Patent No.: US 11,763,361 B2
(45) Date of Patent: *Sep. 19, 2023

(54) AUGMENTED REALITY SYSTEMS FOR FACILITATING A PURCHASING PROCESS AT A MERCHANT LOCATION

(71) Applicant: Capital One Services, LLC, McLean, VA (US)

(72) Inventors: David Gabriele, Chicago, IL (US); Justin Smith, Chicago, IL (US); Damaris Kroeber, Bitterfeld-Wolfen (DE)

(73) Assignee: CAPITAL ONE SERVICES, LLC, McLean, VA (US)

( * ) Notice: Subject to any disclaimer, the term of this patent is extended or adjusted under 35 U.S.C. 154(b) by 168 days.

This patent is subject to a terminal disclaimer.

(21) Appl. No.: 17/181,677

(22) Filed: Feb. 22, 2021

(65) Prior Publication Data

US 2021/0233128 A1    Jul. 29, 2021

Related U.S. Application Data

(63) Continuation of application No. 16/195,534, filed on Nov. 19, 2018, now Pat. No. 10,929,902, which is a
(Continued)

(51) Int. Cl.
*G06Q 30/06*    (2023.01)
*G06Q 30/0601*    (2023.01)
(Continued)

(52) U.S. Cl.
CPC ......... *G06Q 30/0601* (2013.01); *G06F 3/015* (2013.01); *G06F 3/017* (2013.01);
(Continued)

(58) Field of Classification Search
CPC ........... G06Q 30/0643; G06Q 30/0623; G06Q 30/0635; G06Q 20/3224; G06F 3/017; G06F 3/013; H04W 4/02; G06T 19/006
(Continued)

(56) References Cited

U.S. PATENT DOCUMENTS 8,606,645 B1    12/2013    Applefeld
9,026,940 B2    5/2015    Jung et al.
(Continued)

FOREIGN PATENT DOCUMENTS

AU    2016203832 A1  *  1/2017  ........... G06Q 20/321

OTHER PUBLICATIONS i) Article, "Digital Retail Award 2017: Here are the Nominees", Targeted News Service [Washington, D.C] Sep. 29, 2017; retrieved from Dialog database on Sep. 26, 2022 (Year: 2017).*
(Continued)

*Primary Examiner* — Yogesh C Garg
(74) *Attorney, Agent, or Firm* — TROUTMAN PEPPER HAMILTON SANDERS LLP; Christopher J. Forstner; John A. Morrissett

(57) ABSTRACT

A method of facilitating an augmented reality experience to purchase an item at a merchant location may be provided. The method may include storing profile data, receiving location data and environmental data from a computing device associated with the stored profile data. Upon determining that the user device has entered a predefined merchant location, the method may include initiating a sequence of augmented reality modes including at least a first augmented reality mode associated with the selection of an item and a second augmented reality mode associated with the payment of the item. The user device may display virtual content in association with each mode, and upon detecting predetermined user inputs such as gestures, fixed gazes, or
(Continued)

moving through thresholds, the system may enable the selection and payment of one or more items by sending a purchase request to a merchant terminal.

20 Claims, 6 Drawing Sheets

Related U.S. Application Data continuation of application No. 15/816,014, filed on Nov. 17, 2017, now Pat. No. 10,134,084.

(51) Int. Cl.
*G06Q 20/32* (2012.01)
*G06F 3/01* (2006.01)
*H04W 4/02* (2018.01)
*G06T 19/00* (2011.01)

(52) U.S. Cl.
CPC ..... *G06Q 20/3224* (2013.01); *G06Q 30/0623* (2013.01); *G06Q 30/0635* (2013.01); *G06Q 30/0643* (2013.01); *H04W 4/02* (2013.01); *G06F 3/013* (2013.01); *G06F 2203/011* (2013.01); *G06T 19/006* (2013.01)

(58) Field of Classification Search
USPC ...................................................... 705/27.2
See application file for complete search history.

(56) References Cited

U.S. PATENT DOCUMENTS

| | | | |
|---|---|---|---|
| 9,361,732 B2 | 6/2016 | Ebstyne et al. | |
| 9,690,374 B2 | 6/2017 | Clement et al. | |
| 9,721,386 B1 | 8/2017 | Worley, III et al. | |
| 9,759,917 B2* | 9/2017 | Osterhout | G06F 3/011 |
| 9,767,585 B1* | 9/2017 | Carter, Jr. | G06T 11/60 |
| 10,007,948 B1 | 6/2018 | Nickerson et al. | |
| 10,008,037 B1 | 6/2018 | Worley, III et al. | |
| 2003/0020707 A1 | 1/2003 | Kangas et al. | |
| 2011/0225069 A1* | 9/2011 | Cramer | G06Q 30/06 705/26.1 |
| 2013/0106910 A1* | 5/2013 | Sacco | G06Q 30/0631 345/633 |
| 2014/0006966 A1 | 1/2014 | Geraci | |
| 2014/0100997 A1 | 4/2014 | Mayerle et al. | |
| 2014/0168056 A1 | 6/2014 | Swaminathan et al. | |
| 2014/0172640 A1* | 6/2014 | Argue | G06Q 30/0641 705/26.61 |
| 2015/0186984 A1* | 7/2015 | Loganathan | G07F 9/0235 705/27.1 |
| 2015/0248235 A1 | 9/2015 | Offenberg et al. | |
| 2016/0042437 A1* | 2/2016 | DeWachter | G06Q 30/0633 705/26.8 |
| 2016/0071326 A1 | 3/2016 | Spivack | |
| 2016/0253745 A1 | 9/2016 | Lee | |
| 2017/0039613 A1 | 2/2017 | Kaehler et al. | |
| 2017/0132842 A1 | 5/2017 | Morrison | |
| 2017/0178356 A1 | 6/2017 | Bhuruth et al. | |
| 2017/0262154 A1* | 9/2017 | Black | G06F 3/012 |
| 2017/0364153 A1* | 12/2017 | Kazansky | G06F 3/011 |

OTHER PUBLICATIONS (ii) Article, "Marvel and Aurasma Unveil," Marvel Augmented Reality at SXSW Publication-Wireless News: NA.M2 Communications, Ltd. (Mar. 2012) ; retrieved from Dialog database on Sep. 26, 2022 (Year: 2012).*
Arthur, Charles, "Augmented reality: it's like real life, but better", The Guardian Newspaper, Mar. 20, 2010, extracted from Google, pp. 1-5.
Wang, Chao et al., "ARShop: A Cloud-based Augmented Reality System for Shopping", Proceedings of the VLDB Endowment, vol. 10, No. 12, Aug. 2017, pp. 1845-1848, extracted from Google Scholar.

* cited by examiner

AUGMENTED REALITY SYSTEMS FOR FACILITATING A PURCHASING PROCESS AT A MERCHANT LOCATION

CROSS REFERENCE TO RELATED APPLICATION

This application is a continuation of, and claims priority under 35 U.S.C. § 120 to, U.S. patent application Ser. No. 16/195,534, filed Nov. 19, 2018, which is a continuation of U.S. patent application Ser. No. 15/816,014, now U.S. Pat. No. 10,134,084, filed Nov. 17, 2017, the contents of which are hereby incorporated by reference in their entirety as if fully set forth herein.

FIELD OF INVENTION

The present disclosure relates to systems and methods for facilitating an augmented reality experience to purchase an item at a merchant location, and more particularly initiating a sequence of two or more augmented reality modes based on a user's presence at a predefined merchant location.

BACKGROUND

Purchasing items from a merchant location, such as a store, typically involves a process of various steps such as selecting an item, configuring the item (i.e., selecting size, type, quantity, etc.), and paying for the item. Purchasing items from different merchants may require a different series of steps, for example, the steps that a customer may take to buy a cup of coffee at a coffee shop may be different than the steps a customer may take to buy a ticket at a train station. It is common for merchants to have employees on staff to help answer questions about items and services that are for sale and to facilitate the selection, configuration, and purchase of such items and services. However, at any given point in time, a merchant's employees may be busy, understaffed, or undertrained, which may make the process of purchasing an item more time-consuming and more difficult for a consumer than necessary.

Augmented reality systems may provide new ways of interacting with merchants by providing virtual content that is associated with physical objects and/or virtual objects, which may be viewed and manipulated by a user of an augmented reality device. However, such augmented reality systems may only provide limited functionality that is not designed to facilitate multi-step merchant-specific shopping processes that are integrated with financial service providers to facilitate a transaction at a merchant location from start to finish.

Accordingly, there is a need for systems and methods for facilitating an augmented reality experience to purchase an item at a merchant location. Such systems can provide a sequence of augmented reality modes that are designed to facilitate the entire process of purchasing an item from a merchant from start to finish. Embodiments of the present disclosure are directed to this and other considerations.

SUMMARY

Disclosed embodiments provide systems and methods for providing an augmented reality experience to purchase an item at a merchant location.

Consistent with the disclosed embodiments, a method of facilitating an augmented reality experience to purchase an item at a merchant location may include storing profile data comprising user payment credentials and user profile information. The method may include receiving location data and environmental data representing a physical environment from a computing device associated with the stored profile data. The method may include determining, based on the location data, that the computing device has entered a predefined merchant location associated with a merchant. The method may include initiating a first sequence of two or more predetermined augmented reality modes associated with steps for purchasing an item at the merchant location in response to determining that the computing device is at the merchant location. The computing device may be configured to display virtual content based on the environmental data in response to activation of at least one of the two or more predetermined augmented reality modes. The method may further include directing the computing device to activate a first augmented reality mode of the two or more predetermined augmented reality modes, wherein the first augmented reality mode is configured to enable user selection of one or more items available for purchase. The method may further include receiving a first user input detected by the computing device following the activation of the first augmented reality mode. The first user input may be associated with selection of at least one of the one or more items available for purchase. The method may further include directing the computing device to activate a second augmented reality mode of the two or more predetermined augmented reality modes in response to receiving the first user input, wherein the second augmented reality mode is configured to enable payment for the one or more selected items. The method may further include receiving a second user input detected by the computing device following the activation of the second augmented reality mode. The second user input may be associated with payment for the one or more selected items. The method may further include providing purchase request data to a merchant terminal to enable a transaction related to the one or more selected items in response to receiving the second user input. The purchase request data may comprise the stored user payment credentials.

Consistent with the disclosed embodiments, systems and non-transitory computer-readable mediums for providing an augmented reality experience to purchase an item at a merchant location are also provided.

Further features of the disclosed system and methods, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
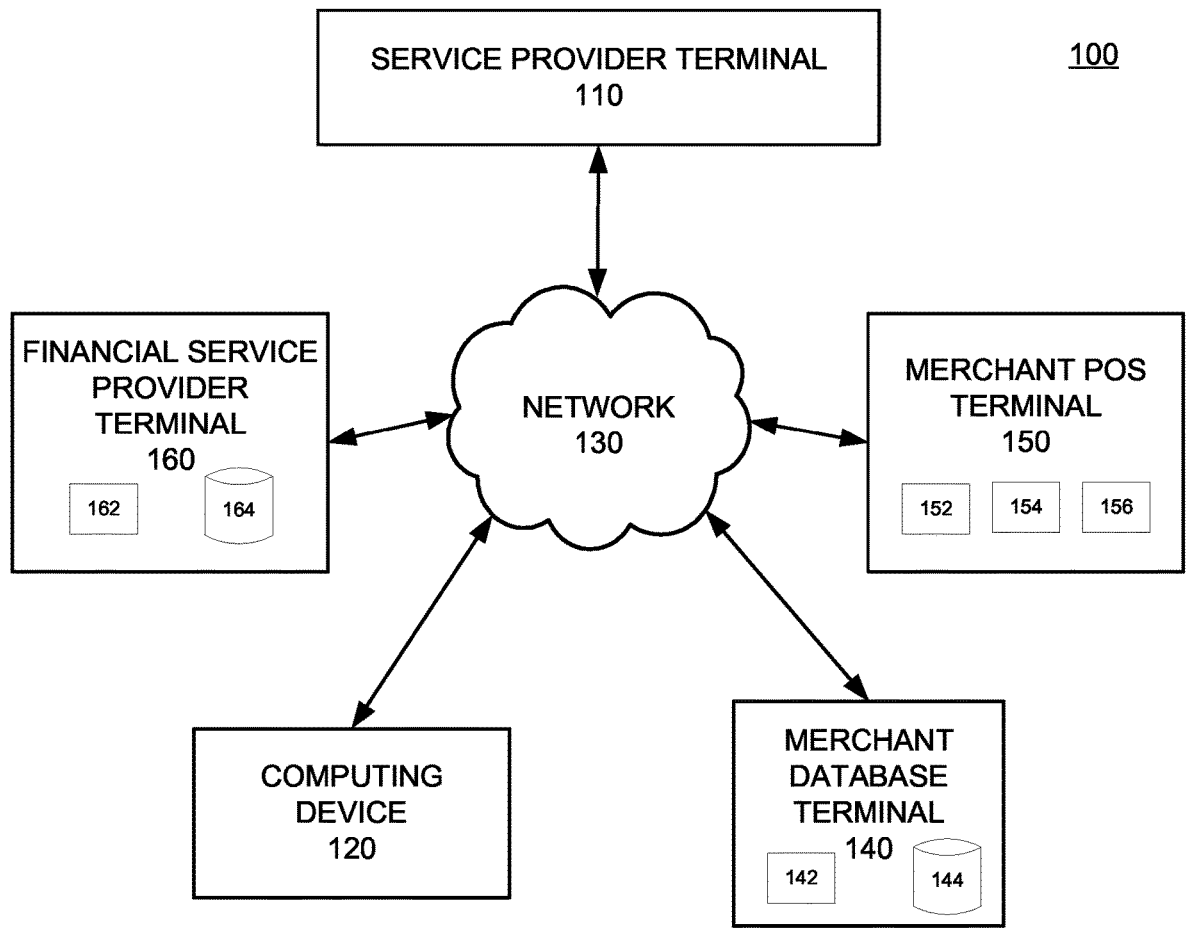
FIG. 1 is a diagram of an exemplary system that may be used facilitate an augmented reality experience to purchase an item at a merchant location.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for facilitating an augmented reality experience to enable the purchase of an item at a merchant location. Consistent with the disclosed embodiments, a method of facilitating an augmented reality experience to purchase an item at a merchant location may include storing profile data comprising user payment credentials and user profile information. The method may include receiving location data and environmental data representing a physical environment from a computing device associated with the stored profile data. The method may include determining, based on the location data, that the computing device has entered a predefined merchant location associated with a merchant. The method may include initiating a first sequence of two or more predetermined augmented reality modes associated with steps for purchasing an item at the merchant location in response to determining that the computing device is at the merchant location. The computing device may be configured to display virtual content based on the environmental data in response to activation of at least one of the two or more predetermined augmented reality modes. The method may further include directing the computing device to activate a first augmented reality mode of the two or more predetermined augmented reality modes, wherein the first augmented reality mode is configured to enable user selection of one or more items available for purchase. The method may further include receiving a first user input detected by the computing device following the activation of the first augmented reality mode. The first user input may be associated with selection of at least one of the one or more items available for purchase. The method may further include directing the computing device to activate a second augmented reality mode of the two or more predetermined augmented reality modes in response to receiving the first user input, wherein the second augmented reality mode is configured to enable payment for the one or more selected items. The method may further include receiving a second user input detected by the computing device following the activation of the second augmented reality mode. The second user input may be associated with payment for the one or more selected items. The method may further include providing purchase request data to a merchant terminal to enable a transaction related to the one or more selected items in response to receiving the second user input. The purchase request data may comprise the stored user payment credentials.

In another aspect, another method for facilitating an augmented reality experience to enable the purchase of an item at a merchant location is disclosed. The disclosed method can include receiving authentication credentials associated with user payment credentials and user profile information at a computing device. The method may include detecting by the computing device, location data and environmental data representing a physical environment of the computing device. The method may include transmitting the location data and environmental data by the computing device to a service provider terminal. The method may include activating a first augmented reality mode by the computing device and in response to receiving a first instruction from the service provider terminal. The first augmented reality mode may be configured to enable user selection of one or more items for purchase. The method may further include displaying a visual indication of one or more items that may be selected for purchase by the computing device and while the first augmented reality mode is active. The method may further include detecting a first user input that is representative of a user selection of at least one of the one or more items for purchase by the computing device and while the first augmented reality mode is active. The method may further include activating a second augmented reality mode by the computing device and in response to receiving a second instruction from the service provider terminal. The second augmented reality mode may be configured to enable payment for the one or more selected items. The method may further include detecting a second user input that is representative of a user's intent to pay for the one or more selected items by the computing device and while the second augmented reality mode is active. The method may further include transmitting the second user input to the service provider terminal.

In another aspect, another method of facilitating an augmented reality experience to enable the purchase of an item at a merchant location is disclosed. The disclosed method can include detecting that a computing device associated with a user has entered a predefined merchant location associated with the merchant by a merchant terminal associated with a merchant. The method may include initiating a sequence of two or more predetermined augmented reality modes associated with steps for purchasing an item at the merchant location in response to detecting the computing device at the merchant location. The method may further include directing the computing device to activate a first augmented reality mode of the two or more predetermined augmented reality modes. The first augmented reality mode may be configured to enable user selection of one or more items for purchase. The method may further include receiving a first user input detected by the computing device following the activation of the first augment reality mode. The first user input may be associated with selection of at least one of the one or more items for purchase. The method may further include directing the computing device to activate a second augmented reality mode of the two or more predetermined augmented reality modes in response to receiving the first user input. The second augmented reality mode may be configured to enable payment for the one or more selected items. The method may further include receiving a second user input detected by the computing device following the activation of the second augment reality mode. The second user input may be associated with payment of at least one of the one or more items for purchase. The method may further include receiving purchase request data to enable a transaction related to the one or more selected items from a financial service provider terminal and following the activation of the second augmented reality mode. The purchase request data may comprise user payment credentials.

Although many of the disclosed embodiments are directed towards methods, it is contemplated that such methods may be embodied in both systems and non-transitory computer readable medium. A system may include one or more memory devices storing instructions, and one or more processors configured to execute the instructions to perform steps of a method of facilitating an augmented reality experience to enable the purchase of an item at a merchant location as described herein. A non-transitory computer-readable medium may store instructions that, when executed by one or more processors, may cause a computing device to perform a method of facilitating an augmented reality experience to enable the purchase of an item at a merchant location as described herein.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary system that may be configured to perform one or more processes that can facilitate an augmented reality experience to purchase an item at a merchant location. According to some embodiments, a merchant location may be a physical location such as a storefront, or alternatively a merchant location may include a virtual location, such as a virtual storefront that is not physically present in a location but that may be virtually displayed by a computing device at an associated location. The components and arrangements shown in FIG. 1 are not intended to limit the disclosed embodiments as the components used to implement the disclosed processes and features may vary.

In accordance with disclosed embodiments, transaction facilitating system 100 may include a service provider terminal 110 in communication with a computing device 120 via network 130. In some embodiments, service provider terminal 110 may also be in communication with a merchant database terminal 140 via network 130. Computing device 120 may be a mobile computing device (e.g., a smart phone, tablet computer, smart wearable device, portable laptop computer, voice command device, wearable augmented reality device, or other mobile computing device). In some embodiments, computing device 120 may be configured to provide one or more of an augmented reality and a virtual reality experience to one or more users, and may be equipped with a visual display, speakers or other auditory devices, tactile simulators, and other devices configured to engage the user's senses to enhance the augmented/virtual reality experience.

In some embodiments, transaction facilitating system 100 may connect to merchant database terminal 140 that communicates with other devices of system 100 via network 130. In some embodiments, transaction facilitating system 100 may also include a merchant point of sale (POS) terminal 150 that may communicate with other devices of system 100 via network 130. Additionally, in some embodiments, transaction facilitating system 100 may also include a financial service provider terminal 160 that may communicate with other devices of system 100 via network 130.

Network 130 may be of any suitable type, including individual connections via the internet such as cellular or WiFi networks. In some embodiments, network 130 may connect terminals using direct connections such as radio-frequency identification (RFID), near-field communication (NFC), Bluetooth™, low-energy Bluetooth™ (BLE), WiFi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
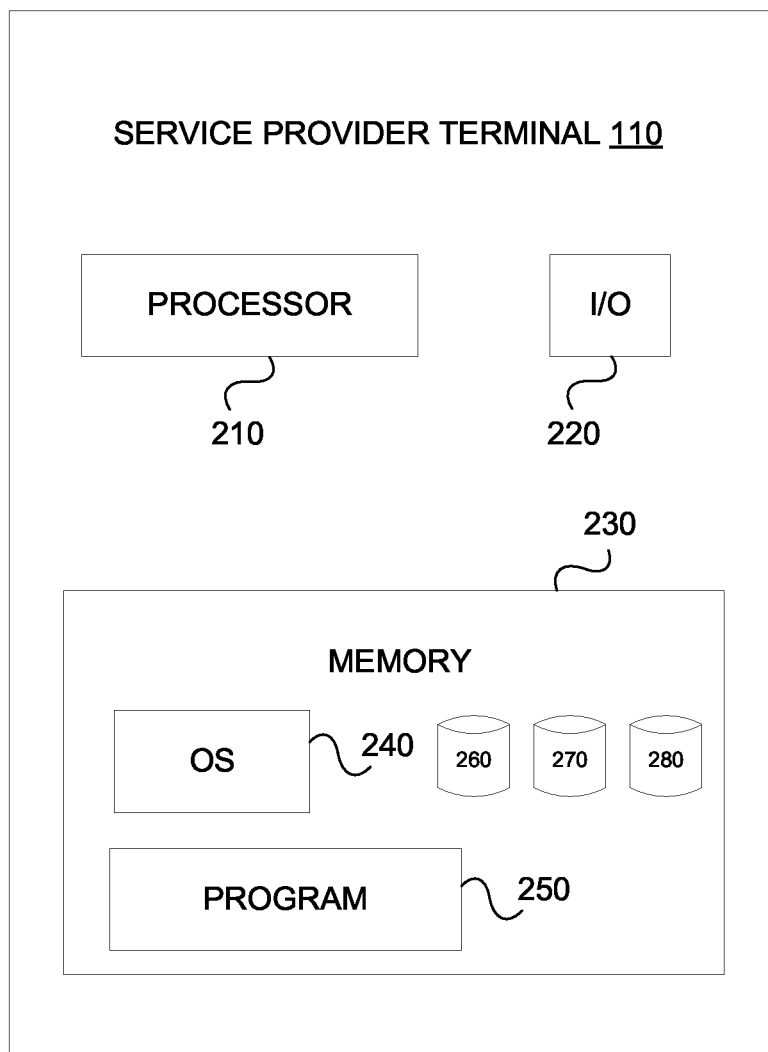
FIG. 2 is a component diagram of an exemplary service provider terminal.

An exemplary embodiment of service provider terminal 110 is shown in more detail in FIG. 2. Computing device 120, merchant database terminal 140, merchant POS terminal 150, and financial service provider terminal 160 may have a similar structure and components that are similar to those described with respect to service provider terminal 110. As shown, service provider terminal 110 may include a processor 210, an input/output ("I/O") device 220, a memory 230 containing an operating system ("OS") 240 and a program 250. For example, service provider terminal 110 may be a single server or may be configured as a distributed computer system including multiple servers or computers that interoperate to perform one or more of the processes and functionalities associated with the disclosed embodiments. In some embodiments, service provider terminal 110 may further include a peripheral interface, a transceiver, a mobile network interface in communication with processor 210, a bus configured to facilitate communication between the various components of the service provider terminal 110, and a power source configured to power one or more components of service provider terminal 110.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 210 to communicate with other devices via wired or wireless networks, whether local or wide area, private or public, as known in the art. A power source may be configured to provide an appropriate alternating current (AC) or direct current (DC) to power components.

As described above, service provider terminal 110 may configured to remotely communicate with one or more other devices, such as computer device 120, merchant database terminal 140, merchant POS terminal 150, and financial service provider terminal 160. According to some embodiments, service provider terminal 110 may be configured to receive merchant data and/or purchase requests from merchant database terminal 140 and/or merchant POS 150, environmental data, location data, and/or purchase requests from computing device 120, and payment authorizations and/or payment credentials from financial service provider terminal 160. In some embodiments, service provider terminal 110 may be configured to transmit virtual environmental data, virtual content, and/or instructions to generate virtual content associated with one or more augmented reality modes to computing device 120. Service provider terminal 110 may be further configured to transmit or forward purchase requests and payment authorizations between computing device 120, merchant database terminal 140, merchant POS terminal 150, and/or financial service provider terminal 160 as necessary to facilitate the purchase of one or more items at a merchant location.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Service provider terminal 110 may include one or more storage devices configured to store information used by processor 210 (or other components) to perform certain functions related to the disclosed embodiments. In one example, service provider terminal 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, service provider terminal 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, service provider terminal 110 may include memory 230 that may include one or more programs 250 to perform one or more functions of the disclosed embodiments. Moreover, processor 210 may execute one or more programs 250 located remotely from service provider terminal 110. For example, service provider terminal 110 may access one or more remote programs 250, that, when executed, perform functions related to disclosed embodiments. In some embodiments, one or more programs 250 may be configured to generate one or more augmented reality modes based on one or more of environmental data, virtual environmental data, merchant data, profile data, biometric data, or device data. Biometric data may be data that is associated with user of computing device 120, such as respiratory rate, heart rate, pupil dilation, blood pressure, temperature, and the like, that may be collected by one or more sensors that may be associated with computing device 120 or some other networked device. According to some embodiments, system 100 may determine one or more emotional or mental states (e.g., whether a user is happy, sad, angry, frustrated, tired, distracted, under stress, aggressive, etc.) of a user of computing device 120 based on the detected biometric data. For example, service provider terminal 110 may determine that a user of computing device 120 is under stress based on the user's heart rate exceeding a predetermined threshold. In some embodiments, service provider terminal 110 may be configured to determine an emotional state or an intent of the user based on brainwave data obtained from a sensor configured to detect brainwaves of a user. In some embodiments, service provider terminal 110 may be configured to determine an action, such as a selection of an item, based on brainwave data associated with the user, such that for example, a user may select an item simply by thinking about the item. Device data may represent user inputs to computing device 120, such as a press of a button, a swipe of a screen, a click of a mouse, an oral command or sound, and the like. In some embodiments, service provider terminal 110 may store one or more sequences or augmented reality modes that may be associated with the process of purchasing one or more items or services from a merchant.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include a merchant information database 260, an environment database 270, and a virtual environmental database 280 for storing related data to enable service provider terminal 110 to perform one or more of the processes and functionalities associated with the disclosed embodiments. Merchant information database 260 may include stored data relating to product price, product inventory, related products, and available discounts associated with one or more products associated with one or more merchants. Environment database 270 may include stored data relating to a physical environment that is captured by one or more devices (e.g., computing device 120) of system 100. Virtual environment database 280 may include stored data relating to a virtual environment, virtual environmental data, or virtual objects that can be updated based upon interactions with one or more devices (e.g., computing device 120) of system 100 and may be used to generate and track virtual content being displayed and/or interacted with by one or more devices (e.g., computing device 120). Virtual content may be content that may be superimposed over a display of reality via computing device 120 (e.g., a wearable augmented reality device) to create an augmented reality including virtual elements that are not physically present in the environment being viewed by a user of computing device 120 but that may be virtually viewed and interacted with by the user via computing device 120. According to some embodiments, the system (e.g., computing device 120) may create an augmented reality by combining virtual environmental data with environmental data and simultaneously displaying physical and virtual content. Virtual environmental data may represent virtual content that may be used to create a virtual environment and/or an augmented reality environment. According to some embodiments, a virtual object may be an object that is not physically present in the immediate physical environment that is viewable or detectable via computing device 120 but that is visually represented in a virtual or augmented environment that is superimposed over the physical environment by computing device 120. For example, a user of computing device 120 may be at a shoe store viewing shoes that are physically present on a shoe rack, and computing device 120 may display virtual objects that represent alternative styles or colors of shoes to the physical shoes being viewed by the user, which may not be physically present in the environment, so that the user can visually compare the different styles. According to some embodiments, the store may sell physical objects corresponding to virtual objects that are not present in the immediate physical environment by, for example, having inventory corresponding to the virtual objects stored at a different portion the merchant location (e.g., shoes stored out of sight in a storeroom) or system 100 may enable the user to place an order of an item corresponding to a virtual object for delivery from a remote inventory of the merchant (e.g., by communicating an order to merchant POS terminal 150 which may then be fulfilled via a delivery from a remote warehouse associated with the merchant). In some embodiments, virtual objects may be objects that are associated with an object that is physically present in the immediate environment, such as for example, virtual objects that represent options for toppings (e.g., butter, salt, etc.) displayed next to a bag of popcorn that is for sale and is present in the immediate physical environment. In some embodiments, virtual objects may represent objects that are present in the immediate physical environment, such as for example, a virtual object that represents a virtual menu or several virtual cup icons displaying different types of coffee that are physically present behind a counter at a coffee shop that a user of computing device 120 is at.

Service provider terminal 110 may also be communicatively connected to one or more memory devices (e.g., databases (not shown)) locally or through a network. The remote memory devices may be configured to store information and may be accessed and/or managed by service provider terminal 110. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Service provider terminal 110 may also include one or more I/O devices 220 that may comprise one or more interfaces for receiving signals or input from devices and providing signals or output to one or more devices that allow data to be received and/or transmitted by service provider terminal 110. For example, service provider terminal 110 may include interface components, which may provide interfaces to one or more input devices, such as one or more keyboards, mouse devices, touch screens, track pads, trackballs, scroll wheels, digital cameras, microphones, sensors, and the like, that enable service provider terminal 110 to receive data from one or more users (such as via computing device 120).

In exemplary embodiments of the disclosed technology, service provider terminal 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

According to some embodiments, service provider terminal 110 may be configured to receive environmental data from another device (e.g., computing device 120), merchant data from merchant POS terminal 150, location data from computing device 120, and generate virtual environmental data and/or virtual content to be used in association with one or more augmented reality modes that are configured to facilitate specific processes or functions related to purchasing an item. For example, various augmented reality modes that may be generated by the system 100 that are disclosed herein may include, but are not limited to, an augmented reality item selection mode, an augmented reality item configuration mode, an augmented reality payment mode, an augmented reality navigation mode, an augmented reality information mode, and an augmented reality communication mode. According to some embodiments, an augmented reality item selection mode may facilitate the selection of one or more physical or virtual items or services by a user of system 100. In some embodiments, an augmented reality item configuration mode may facilitate the configuration and/or customization of a selected item or service. In some embodiments, an augmented reality payment mode may facilitate the purchase of one or more selected items or services by, for example, authorizing the transaction using a payment account associated with a user. In some embodiments, an augmented reality information mode may facilitate the display of information relating to one or more physical or virtual objects, such as for example, displaying movie times at a theater, information pertaining to sales at a merchant, news or historical information pertaining to a location that computing device 120 is present at, and other such general information. In some embodiments, an augmented reality communication mode may facilitate communication by a user of computing device 120 with remote users of other devices by for example, providing communication functionalities such as text message, instant message, email, phone or voice-over-IP call, video messaging, and the like, by enabling a user to input a written, spoken, and visual message using computing device 120 and displaying received messages.

In some embodiments, only one augmented reality mode may be active at a time, and therefore when a new augmented reality mode is activated the previous augmented reality mode may be deactivated. According to some embodiments, the activation of each augmented reality mode may cause computing device 120 to display certain virtual content designed to facilitate a particular functionality associated with the activated augmented reality mode. For example, the activation of augmented reality item selection mode by service provider terminal 110 may cause computing device 120 to display virtual content that may be selected (or otherwise interacted with) in response to the detection of user input data to enable the selection of one or more items for purchase. According to some embodiments, any of the augmented reality modes described herein may include, may be temporarily interrupted by, or may be separated in sequence by a virtual reality mode that may cause display 306 of computing device 120 to display content that is entirely virtual. For example, if a user uses system 100 to buy a cup of coffee at a merchant, following an augmented reality payment mode, while a user is waiting for their coffee to be made, service provider terminal 110 may cause computing device 120 to display an entirely virtual jungle world to entertain the user of computing device 120 and strengthen the emotional response the user experiences in relation to the purchase. According to some embodiments, each augmented reality mode may have an associated degree, level, or range of virtual immersion. For example, a first augmented reality mode may only limit display 306 to only being 10% occupied by virtual content, whereas another augmented reality mode may cause display 306 to be 70-80% occupied by virtual content, and a third augmented reality mode may cause display 306 to be 100% occupied by virtual context such that the field of view of reality is entirely obscured. In this way, as computing device 120 transitions between augmented reality modes, a user may experience a transition between different levels of virtual immersion ranging from viewing reality in its entirety to viewing an entirely virtual environment, as well as various levels of augmented reality between.

According to some embodiments, based on the location data of computing device 120, user profile information, and/or a detected intent to purchase an item, service provider terminal 110 may initiate a predetermined sequence of augmented reality modes associated with steps for purchasing an item at a merchant location that are designed to facilitate different actions that may be necessary in a process of purchasing a particular item or type of item at a particular merchant location. According to some embodiments, the predetermined sequence may be determined by an operator of system 100 or a merchant. According to some embodiments, one or more such predetermined sequences may be determined or modified by a user of system 100. According to some embodiments, the predetermined sequence may be determined by system 100 (e.g., via service provider terminal 110) for a particular user based on user preferences stored by service provider terminal 110 in association with the user. In some embodiments, service provider terminal 110 may initiate a transition to a particular augmented reality mode or may initiate a predetermined sequence of augmented reality modes based on detected biometric data associated with a user of computing device 120, an emotional state of the user of computing device 120, which may be determined by service provider terminal 110 based on biometric data, a detected condition of the physical environment (e.g., sounds, lighting, images, etc.), or a detected input to computing device 120 (e.g., a press of a button, a scroll, a motion of the device, etc.). As described in greater detail below with respect to FIG. 4, service provider terminal 110 may initiate different augmented reality modes of a predetermined sequence in response to determining that computing device 120 has entered a predefined merchant location and/or in response to receiving one or more predefined user inputs associated with the previous augmented reality mode. According to some embodiments, service provider terminal 110 may initiate a sequence of predetermined reality modes in response to determining that a user of computing device 120 has formed an intent to make a purchase of an item, regardless of whether the user is at the merchant location.

While service provider terminal 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the service provider terminal 110 may include a greater or lesser number of components than those illustrated.

Merchant database terminal 140 may have one or more processors 142 and one or more merchant databases 144, which may be any suitable repository of merchant data. Merchant database terminal 140 may be located at the POS location, off-site at another merchant location, or at a third-party location. Information stored in merchant database terminal 140 may be accessed (e.g., retrieved, updated, and added to) via network 130 by one or more devices (e.g., service provider terminal 110) of system 100. In other embodiments, merchant POS terminal 150 may be configured to process online, remote, and/or in-person transactions on behalf of the associated merchant. Merchant database 144 may store merchant data, such as information relating to products and services offered by merchants, pricing, quantity, availability, discounts, reviews, and any other such generally available information that a consumer may utilize in making a purchasing decision. In some embodiments, merchant database 144 may also include location information associated with products and services that identifies the location(s) that a particular product or service is available for purchase. In some embodiments, the location information may include an identification of a particular store, terminal, or kiosk that the product or service may be purchased from. In some embodiments, merchant database 144 may store one or more sequences of augmented reality modes that may be associated with the process of purchasing one or more particular types of items or services. In some embodiments, augmented reality modes and sequences stored by merchant database 144 may be accessed by service provider terminal 110 in the course of initiating a sequence of augmented reality modes.

Merchant POS terminal 150 may have one or more POS devices 152, 154, 156 that may communicate with one or more devices (e.g., computing device 120) of system 100 via network 130. In some embodiments, POS devices 152, 154, 156 may be associated with one or more products or items at a POS location, and may serve as beacons to identify the associated products or items and related information to one or more devices of system 100. Further, in some embodiments, POS devices 152, 154, 156 may serve as beacons that are capable of detecting when computing device 120 is within a predetermined proximity. POS devices 152, 154, 156 may be configured so that they are capable of wirelessly communicating with computing device 120.

Figure 3:
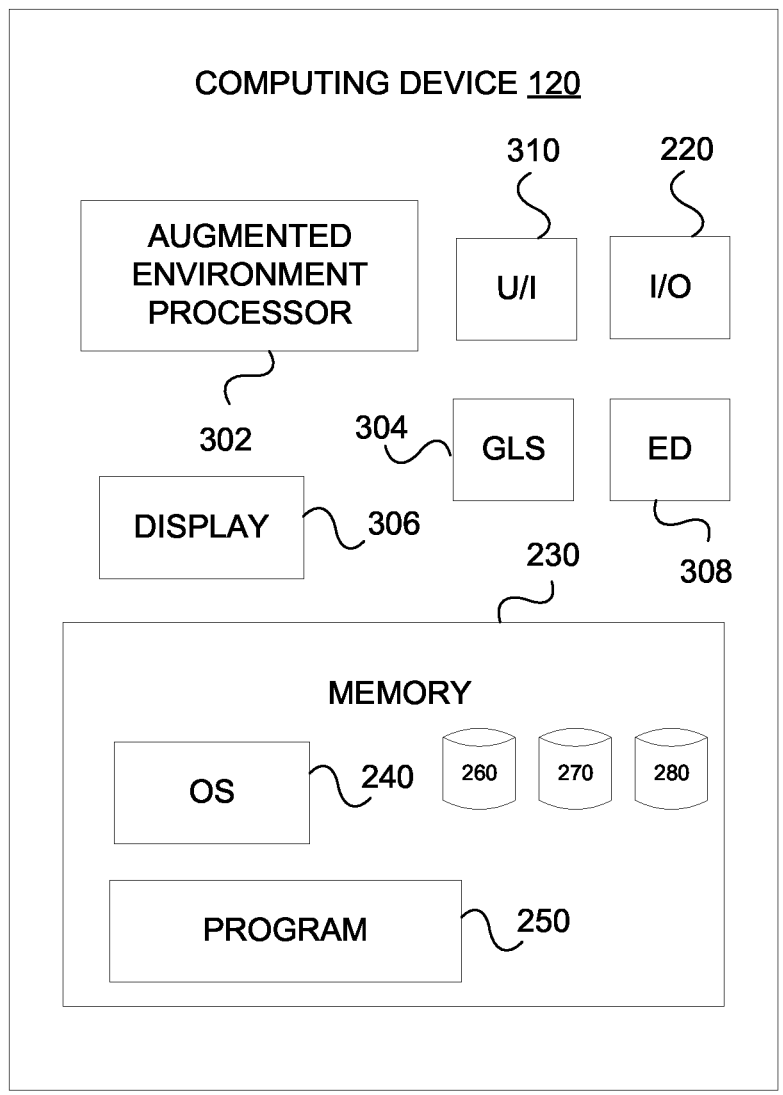
FIG. 3 is a component diagram of an exemplary computing device.

FIG. 3 shows an exemplary embodiment of computing device 120. As shown, computing device 120 may include input/output ("I/O") device 220 for receiving virtual environmental data and/or virtual content from another device (e.g., service provider terminal 110 or merchant POS terminal 150), memory 230 containing operating system ("OS") 240, program 250, and any other associated component as described above with respect to service provider terminal 110. In some embodiments, memory 230 of computing device 120 may optionally include one or more of merchant information database 260, environment database 270, and virtual environmental database 280. Computing device 120 may also have one or more processors, including an augmented environment processor 302 for generating signals representative of augmented and/or virtual environments, a geographic location sensor ("GLS") 304 for determining the geographic location of computing device 120, an augmented environmental data display 306 for displaying augmented environmental data, virtual content, and/or virtual objects, an environmental data ("ED") sensor 308 for obtaining environmental data including audio and/or visual information representing a physical environment as well as user input data, such as gestures, gazes, and other movements associated with a physical or virtual object, as well as movements through physical or virtual thresholds such as doorways, and a user interface ("U/I") device 310 for receiving user input data, such as data representative of a click, a scroll, a tap, a press, or typing on an input device that can detect tactile inputs. User input data may also be non-tactile inputs that may be otherwise detected by ED sensor 308. For example, user input data may include auditory commands, gestures such as pointing, grabbing, swiping, scrolling, or touching motions with respect to objects that are present in the physical environment (e.g., pointing at an item that is physically present on a shelf) or virtual objects (e.g., pointing at a virtual item that is virtually displayed as being on a shelf), as well as other physical acts that may be detected by ED sensor 308, such as focusing a gaze of the user or image capture device of computing device 120 on a physical or virtual item or object for a predetermined amount of time or moving through a physical or virtually represented doorway or some other threshold. User input data may also include biometric data associated with a user of computing device 120 obtained by one or more sensors (e.g., ED sensor 308). According to some embodiments, user input data may also comprise an emotional state of a user of computing device 120 that may, for example, be determined by service provider terminal 110 based on biometric data detected by one or more sensors. According to some embodiments, U/I device 310 may include some or all of the components described with respect to input/output device 220 above. In some embodiments, ED sensor 308 may include a microphone and/or an image capture device, such as a digital camera.

According to some embodiments, augmented environment processor 302 may include some or all of the features and functions of processor 210 described above. Further, augmented environment processor 302 may be configured to, based on environmental data obtained from the environmental data sensor, identify one or more items in the environmental data, augment the environmental data by adding the virtual environmental data representing virtual content associated with one or more of the items, and generate a signal comprising augmented environmental data. Virtual content may be content that is unrepresented in the physical environment. The augmented environmental data display 306 may be configured to receive the signal comprising augmented environmental data and display the augmented environmental data in accordance with the signal to display virtual content such as virtual objects. According to some embodiments, the environmental data may include data associated with virtual objects that renders the virtual objects selectable or otherwise manipulatable in response to the detection of predetermined user inputs.

According to some embodiments, augmented environment processor 302 may be configured to process user input data to determine a user input, by for example, identifying gestures detected by ED sensor 308 that are associated with a physical or virtual object, determining that the gaze of a user of computing device 120 has been focused on a physical or virtual object for longer than a predetermined period of time, or determining that the user of computing device 120 has moved through a physical or virtual threshold, such as a doorway, or otherwise identifying some other meaningful or predetermined user action. According to some embodiments, the system 100 may utilize ED sensor 308 to detect the direction of the gaze of a user of computer device 120 and augmented environment processor 302 may determine what physical or virtual object the user is focused on based on the environmental data and virtual environmental data. Likewise, in some embodiments, augmented environment processor 302 may determine that a user gesture is directed towards a particular physical or virtual object by determining the direction or orientation of the gesture relative to one or more physical or virtual objects.

Following the detection of a user input, augmented environment processor 302 may execute one or more commands associated with the user input with regards to the current augmented reality mode. For example, in some embodiments, during the activation of an augmented reality item selection mode, detection of a user pointing at a physical or virtual object may cause augmented environment processor 302 to generate an indication of a selection of the object, whereas, during the activation of an augmented reality payment mode, detection of a user pointing at a physical or virtual object may cause augmented environment processor 302 to generate an indication of a deselection of the object. It will be understood that in various embodiments, different user inputs may be associated with different commands and that there are many possible different user input-command combinations that may be used in association with many different augmented reality modes.

According to some embodiments, based on the detection or receipt of user input data that indicates the selection of one or more items for purchase and user input data that indicates an intent to complete a purchase, input/output device 220 may be configured to provide purchase request data to service provider terminal 110, merchant POS terminal 150, or financial service provider terminal 160 to enable a transaction related to the one or more items that have been selected for purchase. Purchase request data may include identification information (e.g., type of item, brand, quantity, selected configurations, etc.) of the selected items for purchase and user profile information. User profile information may be information sufficient to identify a user associated with computing device 120. User profile information may also include other information such as payment account information, merchant preferences, item preferences, delivery addresses, and other information that may be used in facilitating a purchase of one or more items. In some embodiments, the purchase request data may comprise stored user payment credentials. In some embodiments, payment credentials may be stored by financial service provider terminal 160, service provider terminal 110, or some other device.

Figure 4:
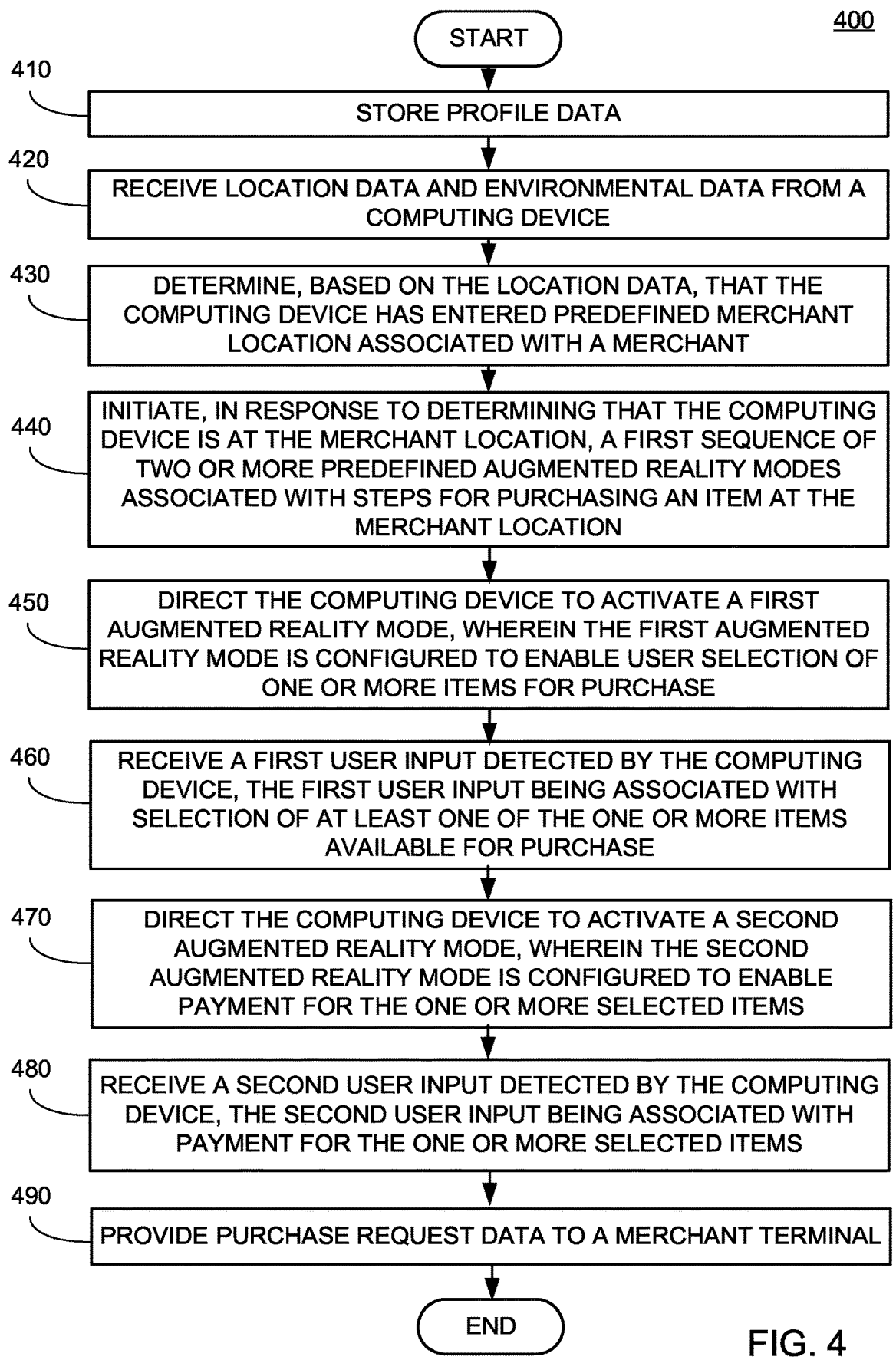
FIG. 4 is a flowchart of an exemplary method for facilitating an augmented reality experience to purchase an item at a merchant location.

FIG. 4 shows a flowchart of method 400 for facilitating an augmented reality experience to purchase an item at a merchant location. Method 400 may be performed by service provider terminal 110 using processor 210 to execute memory 230. In some embodiments, one or more steps of method 400 may be delegated to other devices or systems in system 100, such as computing device 120, merchant database terminal 140, merchant POS terminal 150 and/or financial service provider terminal 160. Following method 400, a user may be enabled to purchase one or more items at a merchant location using a sequence of predetermined augmented reality modes designed to facilitate the process of making the purchase.

At block 410, the system (e.g., service provider terminal 110) may store profile data. Profile data may include information such as payment credentials and/or user profile information. Profile data may be entered directly by a user (e.g., via computing device 120 or merchant POS terminal 150), or stored on and retrieved from merchant database terminal 140 or financial service provider terminal 160. Payment credentials may include credit card information, including standard or tokenized versions of the credentials, financial account information (e.g., which may be associated with financial service provider terminal 160) or other financial information as needed to initiate and authorize a payment, while profile information can include delivery locations, billing addresses, previous transactions, other transaction metadata (e.g., location, time, etc.), user preferences relating to products and services, user preferences relating to preferred user input commands to trigger a transition between augmented reality modes, and merchant account numbers.

At block 420, the system (e.g., service provider terminal 110) may receive location data and environmental data representing a physical environment via for example, computing device 120. According to some embodiments, the environmental data may comprise audio and visual information representing a physical environment, such as an environment of computing device 120. Location data may be derived from, for example data obtained from GLS 304 of computing device 120.

At block 430, the system (e.g., service provider terminal 110) may determine that computing device 120 has entered a predefined merchant location based on the location data. For example, based on location data gathered by GLS 304, the system may determine that computing device is within a predefined area, such as inside a store, a gas station, a restaurant, a mall, or any other such merchant facility. Alternatively, the system may determine that computing device 120 is within a predetermined distance from a boundary or point associated with the merchant location. As will be appreciated by those of skill in the art, system 100 may utilize geofencing to set predefined virtual boundaries or points from which the relative position of computing device 120 may be determined. According to some embodiments, merchant POS terminal 150 may determine that computing device 120 has entered the premises of the predefined merchant location by detecting the presence of computing device 120. For example, computing device 120 may connect to a Wi-Fi network hosted by merchant POS terminal 150 or merchant POS terminal 150 may be connected to a sensor or device that is capable of detecting, identifying, and/or connecting with computing device 120. According to some embodiments, service provider terminal 110 may determine that computing device 120 has entered the predefined merchant location in response to receiving a message from merchant POS terminal 150.

Having received the environmental data and location data, service provider terminal 110 may identify one or more merchant items in the visual information of the environmental data. Merchant items may be goods or services for sale at a merchant location. In some embodiments, merchant items can be identified by recognizing shapes (e.g., via 2D or 3D image recognition), bar codes, RFID devices, QR codes, IR-, BLE-, and other beacons located in an environment proximate a merchant location (e.g., POS devices 152, 154, and 156 associated with one or more products or items at a merchant location). Service provider terminal 110 may utilize merchant data that is received from, for example, merchant database terminal 140 or merchant POS terminal 150 in identifying one or more merchant items.

At block 440, the system (e.g., service provider terminal 110) may initiate a first sequence of two or more predetermined augmented reality modes associated with steps for purchasing an item at the merchant location. In some embodiments, the system may initiate the first sequence in response to determining that computing device 120 is at the merchant location, as described in block 430 above. According to some embodiments, computing device 120 may be configured to display virtual content in combination with environmental data obtained from, for example, ED sensor 308, in response to activation of at least one of the two or more predetermined augmented reality modes.

At block 450, the system (e.g., service provider terminal 110) may direct computing device 120 to activate a first augmented reality mode of the two or more predetermined augmented reality modes. In some embodiments, the first augmented reality mode may be configured to enable user selection of one or more items available for purchase (which may be referred to as the "augmented reality item selection mode"). According to some embodiments, based on the activation of the first augmented reality item selection mode, service provider terminal 110 may generate virtual environmental data and/or virtual content associated with the augmented reality item selection mode based on one or more of the identification of the merchant associated with the merchant location, the merchant data associated with the merchant location, identification of merchant items in the environmental data, preferences included in the user profile information, biometric data, or an emotional state of the user. For example, service provider terminal 110 may determine based on biometric data associated with a user of computing device 120 that the user is thirsty, and may therefore generate virtual content related to a selection of beverages to present as items that may be selected for purchase to the user. In some embodiments, service provider terminal 110 may determine (e.g., based on biometric data)

an emotional state of the user and may, for example generate more virtual objects for the user to select from when the user is in a happy state than when the user is in a sad state. Service provider terminal 110 may transmit the virtual environmental data and/or virtual content associated with the augmented reality item selection mode to computing device 120 for display. In some embodiments, computing device 120 may receive the virtual environmental data and/or virtual content and may use it to create an augmented environment when combined with the environmental data. According to some embodiments, virtual content associated with the augmented reality item selection mode may include, for example, virtual objects that may be selected for purchase or virtual visual effects that may be, for example, superimposed over objects present in the physical environment, wherein the virtual visual effects may indicate that an object may be selected for purchase. Thus, in some embodiments, the first augmented reality mode may be configured to cause a display of a visual indication of an item that may be selected for purchase. In some embodiments, the visual indication may be a virtually augmented image of a real or physical item within the field of view of an image capture device associated with computing device 120. In some embodiments, computing device 120 may display virtual objects that represent available alternatives to physical objects at the merchant location. For example, if a red shirt is on display for sale at a clothing store, computing device 120 may display virtual representations of the shirt in other colors that are available in the store's inventory or via the merchant's online store but that may not be included in a physical display at the merchant. Further, in some embodiments, directing computing device 120 to activate a first augmented reality mode may include directing computing device 120 to display a prompt indicating that selection of the item can be achieved in response to detecting the first user input. Such a prompt may be included in the virtual content associated with associated with the augmented reality item selection mode.

At block 460, the system (e.g., service provider terminal 110) may receive a first user input. The first user input may represent a user selection of one or more items for purchase and may be received by the system following the activation of the first augmented reality mode. In some embodiments, the first user input may be detected by computing device 120 and transmitted to service provider terminal 110. According to some embodiments, during the augmented reality item selection mode, a user of computing device 120 may select one or more items for purchase by performing a user input action that is detectable by computing device 120 and associated with a command to select an item, such as, for example, gesturing at a physical or virtual object by performing a clicking, swiping, grabbing or pointing motion, gazing at a physical or virtual object for longer than a predetermined amount of time, thinking about the object, or moving through a physical or virtual threshold such as a doorway. In some embodiments, a user input may constitute performing a click or a swipe of U/I device 310 while the gaze of a user of computing device 120 is determined by the system to be focused on a physical or virtual object for more than a predetermined amount of time.

At block 470, the system (e.g., service provider terminal 110) may direct computing device 120 to activate a second augmented reality mode of the two or more predetermined augmented reality modes. In some embodiments, the second augmented reality mode may be configured to enable payment for one or more items available for purchase (which may be referred to as the "augmented reality payment mode"). According to some embodiments, based on the activation of the second augmented reality mode, service provider terminal 110 may generate virtual content associated with the augmented reality payment mode based on one or more of the selected items for purchase, identification of the merchant associated with the merchant location, the merchant data associated with the merchant location, and preferences included in the user profile information. Service provider terminal 110 may transmit the virtual content associated with the augmented reality payment mode to computing device 120 for display. According to some embodiments, virtual content associated with the augmented reality payment mode may include, for example, virtual content and/or virtual objects or virtual visual effects that may be, for example, superimposed over objects present in the physical environment which may indicate that such virtual or physical objects may be selected to initiate a payment. For example, in some embodiments, virtual content associated with the augmented reality payment mode may include a pair of virtual "yes" and "no" selectable buttons associated with a caption that reads, for example, "Would you like to complete the purchase of these items?" The virtual content associated with the augmented reality payment mode may include a virtual display of an indication of the items that were selected for purchase, quantities, prices, and total prices. In some embodiments, virtual content associated with the augmented reality payment mode may include a virtual representation of various selectable payment methods, such as cash, credit card, debit card, or other payment account that may be selected by a user of computing device 120 to indicate a selected payment method.

At block 480, the system (e.g., service provider terminal 110) may receive a second user input. The second user input may represent a user selection of a command to make the purchase using a specified or predetermined payment account and may be received by the system following the activation of the second augmented reality mode. In some embodiments, the second user input may be detected by computing device 120 and transmitted to service provider terminal 110. According to some embodiments, during the augmented reality purchase mode, a user of computing device 120 may select virtual content associated with the augmented reality payment mode may be made by performing a user input action in a manner similar to that described above with respect to block 480. According to some embodiments, virtual content associated with the augmented reality payment mode may include a virtual doorway or a virtual enhancement of a physical doorway that may be "selected" by detecting that a user associated with computing device 120 has moved through the doorway. For example, in some embodiments, a user may indicate a desire to purchase selected items by walking through a predetermined physical doorway or a virtual doorway provided by display 306 of computing device 120.

At block 490, the system (e.g., service provider terminal 110) may provide purchase request data to a merchant terminal (e.g., merchant POS terminal 150 or merchant database terminal 140) to enable a transaction related to the one or more selected items. According to some embodiments, purchase request data may be generated by computing device 120 and transmitted to service provider terminal 110. The system may provide the purchase request data to a merchant terminal in response to receiving the second user input described in block 480. According to some embodiments, the purchase request data provided to the merchant terminal may include, for example but not limited to, the identification of the one or more items selected for purchase and the stored user payment credentials.

According to some embodiments, an item selected for purchase at a merchant location may optionally require configuration. For example, if the merchant is a coffeeshop and the item is a cup of coffee, a user may need to specify the size of the cup, the type or flavor of coffee, and whether the user desires cream and/or sugar. As will be understood, the foregoing is merely an example and the nature of the features of a selected item or service for purchase that may be configured by a user may vary greatly based on the type of object or service being purchased. Accordingly, in some embodiments, method 400 may additionally include the steps that may result in the creation of configuration data that may represent the selection of one or more of the size of an item, a color of an item, a flavor of an item, a quantity of an item, or any other feature or aspect of an item or service that may be customized or configured via user selection before purchase. For example, such steps may include determining that at least one of the one or more selected items requires configuration prior to purchase, directing computing device 120 to activate a third augmented reality mode of the two or more predetermined augmented reality modes in response to determining that configuration is required, receiving a third user input detected by computing device 120, and providing configuration data to a merchant terminal (e.g., merchant POS terminal 150 or merchant database terminal 140) to enable configuration of the one or more selected items. According to some embodiments, the third augmented reality mode may be configured to enable the configuration of the one or more selected items (which may be referred to as the "augmented reality configuration mode"). The third user input may be associated with configuration of at least one of the one or more selected items. According to some embodiments, during the augmented reality configuration mode, a user of computing device 120 may select virtual content associated with the augmented reality configuration mode by performing a user input action in a manner similar to that described above with respect to block 480. In some embodiments, the third user input may comprise one or more of a click of computing device 120, a swipe of computing device 120, and one or more predetermined user gestures. The virtual content associated with the augmented reality configuration mode may include a virtual display of virtual objects associated with a selected item, such as for example, three differently sized cups indicating small, medium and large coffee sizes, or other selectable virtual content, such as, for example, a virtual drop-down menu that allows a user to select the type or flavor of the item from a predetermined list. As will be appreciated, such virtual content may come in a variety of different forms. According to some embodiments, the configuration data may be provided to the merchant terminal in response to receiving the third user input.

According to some embodiments, method 400 may provide additional steps in a sequence to facilitate the purchase of an item at a merchant location in the case where the user associated with computing device 120 is not yet at the merchant location. For example, embodiments may include the additional steps of receiving an indication that the user associated with the computing device has formed an intent to make a purchase of an item at a merchant location, determining, based on the location data, that the computing device is not at the predefined merchant location, initiating, in response to determining that the computing device is not at the predefined merchant location, a second sequence of two or more predetermined augmented reality modes associated with steps for navigating to the predefined merchant location from a current location of the computing device, and directing the computing device to activate a first augmented reality mode of the second sequence of two or more predetermined augmented reality modes, wherein the first augmented reality mode of the second sequence of two or more predetermined augmented reality modes is configured to enable user navigation to the predetermined merchant location (which may be referred to as the "augmented reality navigation mode"). In some embodiments, virtual content associated with the augmented reality navigation mode may include for example, virtual maps, virtual directions or indications of directions to a merchant location, virtual listings of multiple merchant locations that sell the item or service sought to be purchased, and other such information that may be useful in assisting a user in locating and navigating to a merchant location that offers a desired item or service for sale. According to some embodiments, system 100 may determine that a user has formed an intent to purchase an item based on environmental data obtained from computing device, such as detecting an audible or written indication of the user expressing an intent to purchase an item. According to some embodiments, system 100 may determine that a user has formed an intent to select an item or service, purchase an item or service, or take some other action with respect to an item or service by analyzing biometric data associated with the user by, for example, determining that a user is smiling, that a user has nodded their head, that a user's pupils have dilated, performing an analysis of the user's heart rate, facial expressions, voice, gestures or analyzing a user's brainwaves to determine their intent. In some embodiments, system 100 may analyze text written or spoken by a user to determine the user's intent. It will be appreciated of those of skill in the art that these are merely examples and that system 100 may determine a user's intent based on biometric data in a variety of different ways.

Figure 5:
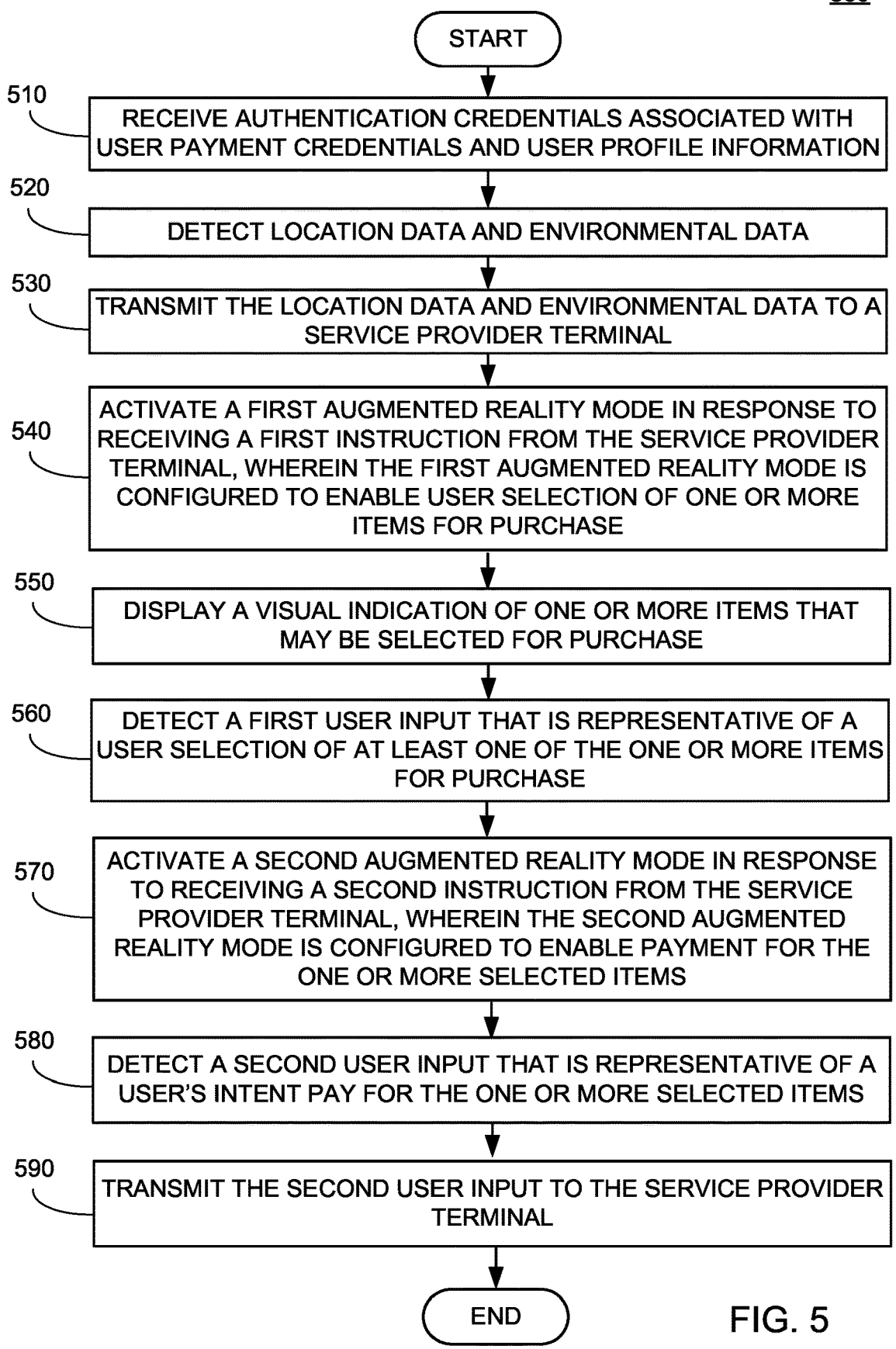
FIG. 5 is a flowchart of another exemplary method for facilitating an augmented reality experience to purchase an item at a merchant location.

FIG. 5 shows a flowchart of method 500 for facilitating an augmented reality experience to purchase an item at a merchant location. Method 500 may be performed by computing device 120 using processor 210 to execute memory 230. In some embodiments, one or more steps of method 400 may be delegated to other devices or systems in system 100, such as service provider terminal 110, merchant database terminal 140, merchant POS terminal 150 and/or financial service provider terminal 160. Following method 500, a user associated with computing device 120 may be enabled to purchase one or more items or services at a merchant location by following a sequence of predetermined augmented reality modes designed to facilitate the process of making the purchase.

At block 510, the system (e.g., computing device 120) may receive authentication credentials associated with payment credentials and user profile information. For example, computing device 120 may receive a username, password, and/or pin number associated with a credit card, debit card or payment account associated with a user of computing device 120.

At block 520, the system (e.g., computing device 120) may detect location data and environmental data representing a physical environment of computing device 120. According to some embodiments, the detected environmental data may include audio and visual information representing a physical environment of computing device 120.

At block 530, the system (e.g., computing device 120) may transmit the location data and environmental data to service provider terminal 110.

At block 540, the system (e.g., computing device 120) may activate a first augmented reality mode in response to receiving a first instruction from service provider terminal 110. As previously described above, a first augmented reality mode may be for example, an augmented reality item selection mode that may cause computing device 120 to receive virtual environmental data associated with the augmented reality item selection mode from service provider terminal 110 and display virtual content to enable the selection of one or more items for purchase as previously described above. According to some embodiments, the first instruction may be sent by service provider terminal 110 in response to a determination by service provider terminal 110 that computing device 120 has entered a predefined merchant location associated with a merchant.

At block 550, the system (e.g., computing device 120) may display a visual indication of one or more items that may be selected for purchase while the first augmented reality mode is active. For example, computing device 120 may display one or more selectable virtual objects (e.g., objects that are not physically present within the immediate view or display of computing device 120 at the merchant location). Computing device 120 may also display objects that are present in the physical location but that have been modified with virtual effects, such as, for example, making a physical item glow, highlighting a physical item, or providing virtual images, icons, or buttons in the vicinity of the physical item. According to some embodiments, computing device 120 may display one or more selectable virtual objects that represent alternatives to physical items that are available for purchase.

At block 560, the system (e.g., computing device 120) may detect a first user input that is representative of a user selection of at least one of the one or more items for purchase. According to some embodiments, detection of a first user input may occur while the first augmented reality mode is active.

At block 570, the system (e.g., computing device 120) may activate a second augmented reality mode in response to receiving a second instruction from service provider terminal 110. As previously described above, a second augmented reality mode may be for example, an augmented reality purchase mode that may cause computing device 120 to receive virtual environmental data associated with the augmented reality purchase mode from service provider terminal 110 and display virtual content to enable the purchase of one or more selected items as previously described above. According to some embodiments, the system may display, by computing device 120 and while the second augmented reality mode is active, a visual indication of one or more payment methods that may be selected to complete a purchase.

At block 580, the system (e.g., computing device 120) may detect a second user input that is representative of a user command to execute a purchase of the one or more selected items. According to some embodiments, detection of a second user input may occur while the first augmented reality mode is active. According to some embodiments, detection of one of the first user input or the second user input comprises detection of a click gesture, a swipe gesture, a focus gesture, or a step gesture. According to some embodiments, detection of a click gesture may comprise detection by computing device 120 of a pointing motion associated with the visual indication of one or more items that may be selected for purchase. In some embodiments, detection of a swipe gesture may comprise detection by computing device 120 of a swiping motion associated with the visual indication of one or more items that may be selected for purchase. In some embodiments, detection of a focus gesture may comprise determining that a gaze of a user of computing device 120 is focused on the visual indication of one or more items that may be selected for purchase for longer than a predetermined threshold amount of time. According to some embodiments, detection of a step gesture may comprise determining that a user of computing device 120 has transitioned through a predetermined gateway or threshold that is present in the physical environment, such as, for example, walking through a doorway present in the physical world or by walking through a virtual doorway presented in an augmented reality display.

At block 590, the system (e.g., computing device 120) may transmit the second user input to service provider terminal 110.

Figure 6:
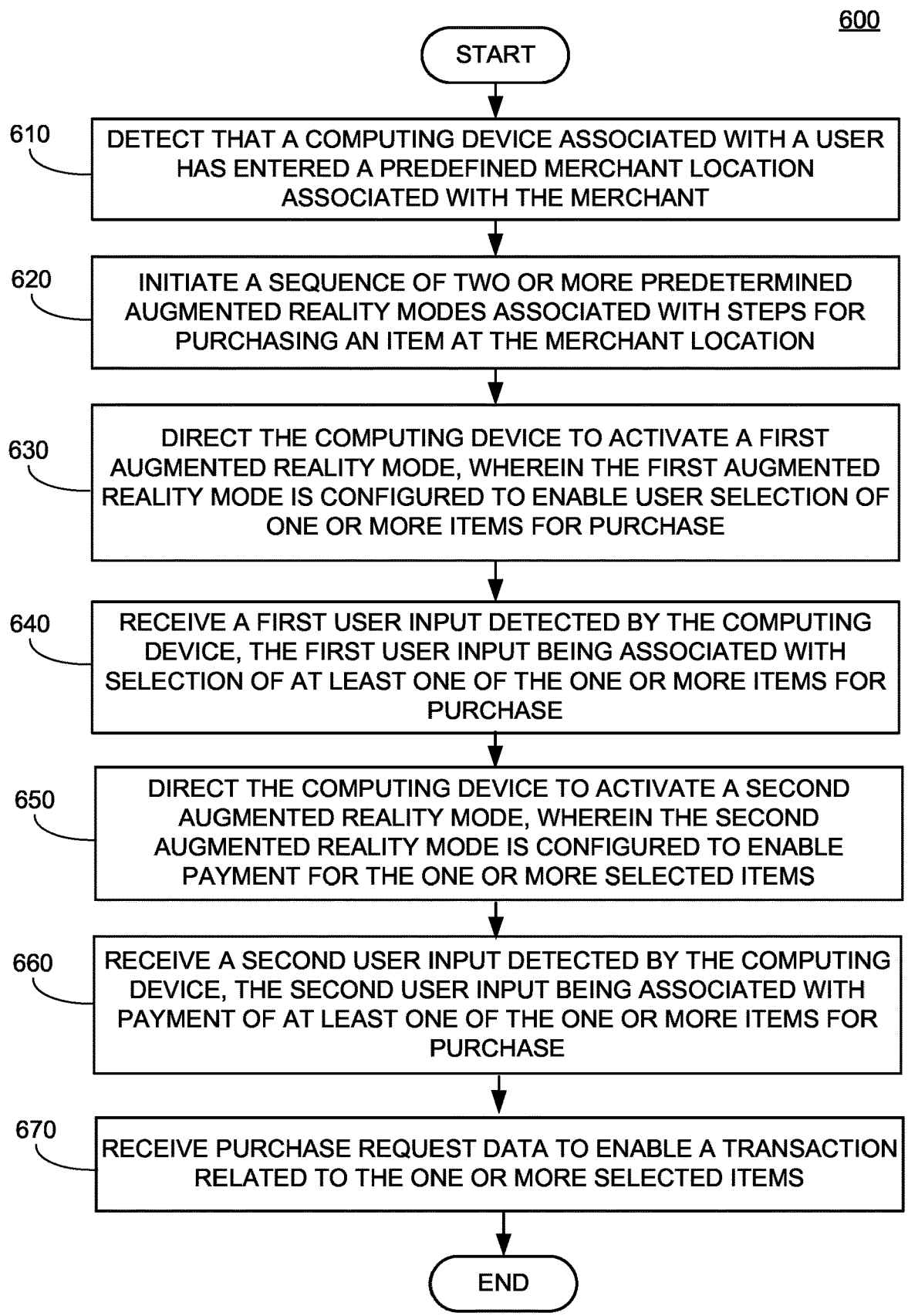
FIG. 6 is a flowchart of another exemplary method for facilitating an augmented reality experience to purchase an item at a merchant location.

FIG. 6 shows a flowchart of method 600 for facilitating an augmented reality experience to purchase an item at a merchant location. Method 600 may be performed by merchant POS terminal 150 using processor 210 to execute memory 230. In some embodiments, one or more steps of method 400 may be delegated to other devices or systems in system 100, such as service provider terminal 110, computing device 120, merchant database terminal 140, and/or financial service provider terminal 160. Following method 600, a user associated with computing device 120 may be enabled to purchase one or more items or services at a merchant location by following a sequence of predetermined augmented reality modes designed to facilitate the process of making the purchase.

At block 610, the system (e.g., merchant POS terminal 150 associated with a merchant) may detect that computing device 120 that is associated with a user has entered a predefined merchant location associated with the merchant. According to some embodiments, the system may detect that computing device 120 has entered the predefined merchant location using beacons, such as POS devices 152, 154, 156, by for example, detecting a wireless signal generated by computing device 120 or establishing a wireless connection with computing device 120.

At block 620, the system (e.g., merchant POS terminal 150) may initiate a sequence of two or more predetermined augmented reality modes associated with steps for purchasing an item at the merchant location. In some embodiments, the sequence may be initiated in response to detecting that computing device 120 at the merchant location.

At block 630, the system (e.g., merchant POS terminal 150) may direct computing device 120 to activate a first augmented reality mode of the two or more predetermined augmented reality modes in a manner substantially similar to that of block 450 described above. According to some embodiments, the first augmented reality mode may be an augmented reality item selection mode.

At block 640, the system (e.g., merchant POS terminal 150) may receive a first user input detected by computing device 120 following the activation of the first augmented reality mode. According to some embodiments, the first user input may be associated with selection of at least one of the one or more items for purchase.

At block 650, the system (e.g., merchant POS terminal 150) may direct computing device 120 to activate a second augmented reality mode of the two or more predetermined augmented reality modes in a manner substantially similar to that of block 470 described above. According to some embodiments, the first augmented reality mode may be an augmented reality purchase mode.

At block 660, the system (e.g., merchant POS terminal 150) may receive a second user input detected by computing device 120 following the activation of the second augmented reality mode. According to some embodiments, the second user input may be associated with payment of at least one of the one or more items for purchase.

At block 670, the system (e.g., merchant POS terminal 150) may receive purchase request data to enable a transaction related to the one or more selected items following the activation of the second augmented reality mode. According to some embodiments, the purchase request data may be received from financial service provider terminal 160. In some embodiments, the purchase request data may comprise user payment credentials.

According to some embodiments, the system (e.g., merchant POS terminal 150) may direct computing device 120 to activate a third augmented reality mode of the two or more predetermined augmented reality modes in response to receiving the first user input. In some embodiments, the third augmented reality mode may be configured to enable configuration the one or more selected items, as described previously above. In some embodiments, the system (e.g., merchant POS terminal 150) may receive, following the activation of the third augment reality mode, a third user input detected by computing device 120. In some embodiments, the third user input may be associated with configuration of at least one of the one or more items for purchase. In some embodiments, the system (e.g., merchant POS terminal 150) update a virtual cart with cart information comprising an identification of the items that have been selected for purchase and a total cost of the items that have been selected for purchase in response to receiving the first user input. In some embodiments, the system (e.g., merchant POS terminal 150) may transmit the cart information to computing device 120 for display by computing device 120.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation,"

"example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use cases describe examples of a typical user flow pattern. It is intended solely for explanatory purposes and not in limitation. A user may be equipped with a device that is capable of generating an augmented reality display and tracking the user's location (e.g., computing device 120). As a user arrives at a merchant location, the system (e.g., service provider terminal 110) may detect that the user is at the store, and based on the nature of the store, the habits of the user, or an expressed desire of the user to purchase a particular item, the system may initiate a sequence of augmented reality modes that are designed to facilitate the user's purchase of an item. For example, if the user is at a coffee shop and wants to buy coffee, the system may activate an augmented reality item selection mode that presents an augmented display with virtual content that may allow the user to select a particular item, such as a particular brand of coffee. The user may make this selection by performing a gesture at the item or a virtual representation of the item displayed by their device (e.g. computing device 120), such as pointing at it, clicking it, grabbing at it, swiping at it, and the like. The user might also select the item by staring at the item or a virtual representation of the item for a predetermined amount of time, which may be detected by the system (e.g., computing device 120). Once the user has selected an item, the system may initiate an augmented reality configuration mode that allows the user to configure the selected item by performing another set of predetermined gestures or other user inputs associated with configuring the item. For example, if the user has selected a cup of coffee, the device (e.g., computing device 120) may display interactive virtual content that allows the user to select the size of the coffee, the flavor, whether they want cream or sugar, or any other such common configuration. Following the configuration of the coffee, the system (e.g., service provider terminal 110) may initiate an augmented reality payment mode that may cause the device (e.g., computing device 120) to display interactive virtual content that may enable the user to select and authorize a payment for the selected items by performing one or more of another set of gestures or user inputs that are associated with selecting and authorizing a payment method. For example, the act of a user walking through a real or virtual doorway as detected by the device (e.g., computing device 120) may generate a purchase request that may trigger a payment authorization. The system (e.g. financial service provider terminal 160) may contact the merchant systems (e.g., merchant POS terminal 150) to provide the payment authorization to execute the sale of the items. In this way, the system may facilitate the process of purchasing an item from a merchant at known location using augmented reality technology.

Another exemplary use case relates to the situation where a user has an intent to purchase an item at another location that is different from the location the user is currently at. The system (e.g. service provider terminal 110) may determine the user's intent to purchase the item by, for example, detecting speech or text that is indicative of the intent (e.g., via computing device 120). For example, the system (e.g., via computing device 120) may hear the user say "I want to go get a coffee." Upon determining the user's intent to purchase an item, the system (e.g., service provider terminal 110) may then determine that the user is not at a merchant location that provides the desired item based on location data provided by the user's device (e.g., computing device 120). Subsequently, the system (e.g., service provider terminal 110) may determine one or more merchant locations near to the user that sell the desired item and may initiate a sequence of predetermined augmented reality modes designed to guide the user to the merchant location and facilitate the purchase of the item. The system (e.g., service provider terminal 110) may first initiate an augmented reality navigation mode that presents virtual data at the user device (e.g., computing device 120) designed to guide the user to the merchant location. For example, the user device (e.g., computing device 120) may provide an augmented reality view that displays direction arrows, maps, indications of gas stations, or alternative merchant options and may update this information as the user proceeds towards the merchant location. Upon arriving at the merchant location, the system (e.g., service provider terminal 110) may determine that the user is at the merchant location and may initiate the augmented reality item selection mode followed by the other modes described above. In this way, the system may detect the user's intent to purchase an item, guide the user to a merchant that sells the item, and facilitate the process of purchasing the item.

What is claimed is:

1. A method of facilitating an augmented reality experience to purchase an item at a merchant location, the method comprising:
    receiving, at a first computing device and from a second computing device, location data and environmental data representing a physical environment, the environmental data comprising data representative of a physical item present in the physical environment;
    responsive to receiving the location data and environmental data, directing, by the first computing device, the second computing device to activate a first augmented reality mode configured to enable user selection of one or more items available for purchase;
    identifying, by the first computing device and based on at least a portion of the environmental data, the physical item;
    generating virtual content by the first computing device and based at least in part on the identified physical item, the virtual content being associated with the identified physical item and the one or more items for purchase;
    transmitting, by the first computing device and to the second computing device, the virtual content for display on a display of the second computing device;
    receiving, by the first computing device, an indication of a first user input detected by the second computing device, the first user input being associated with selection of at least one of the one or more items available for purchase to indicate one or more selected items;
    responsive to receiving the indication of the first user input, directing, by the first computing device, the second computing device to activate a second augmented reality mode configured to enable payment for the one or more selected items;
    receiving, by the first computing device, an indication of a second user input detected by the second computing device, the second user input being associated with payment for the one or more selected items; and
    providing, by the first computing device, purchase request data to a merchant terminal to enable a transaction related to the one or more selected items.

2. The method of claim 1, wherein:
    the first user input comprises one or more of a first click of the second computing device, a first swipe of the second computing device, one or more first predetermined user gestures, and user eye focus exceeding a predetermined time threshold, and
    the second user input comprises one or more of a second click of the second computing device, a second swipe of the second computing device, and one or more second predetermined user gestures.

3. The method of claim 1 further comprising:
    directing, by the first computing device, the second computing device to provide a configuration interface in response to determining that configuration is required, wherein the configuration interface is configured to enable configuration of the one or more selected items;
    receiving, by the first computing device, an indication of a third user input detected by the second computing device, the third user input being associated with configuration of at least one of the one or more selected items; and
    providing, by the first computing device, configuration data to the merchant terminal, the configuration data being associated with the third user input.

4. The method of claim 3, wherein enabling configuration of the at least one of the one or more selected items comprises enabling the selection of at least one of a size of the item, a color of the item, or a flavor of the item.

5. The method of claim 1, wherein directing the second computing device to activate the augmented reality functionality comprises directing, by the first computing device, the second computing device to display a prompt indicating that selection of the item can be achieved.

6. The method of claim 1 further comprising:
    receiving, by the first computing device, an indication that the user associated with the second computing device intends to make a purchase at the merchant location;
    determining, by the first computing device and based on the location data, that the second computing device is not at the merchant location; and
    directing, by the first computing device, the second computing device to navigate, via the augmented reality functionality, to the merchant location from a current location of the second computing device.

7. The method of claim 1, wherein the virtual content comprises a virtual depiction of an item for sale from the merchant, the item being related to the physical item and having a configuration different from a configuration of the physical item.

8. The method of claim 7 further comprising:
    receiving, at the first computing device and from the second computing device, biometric data associated with a user of the first computing device;
    determining, based on the biometric data, a state of the user;
    generating biometric-based virtual content corresponding to the state of the user; and
    transmitting, by the first computing device and to the second computing device, the biometric-based virtual content for display on the display of the second computing device.

9. A method of facilitating an augmented reality experience to purchase an item at a merchant location, the method comprising:
    detecting, by a computing device, location data and environmental data representing a physical environment of the computing device, the environmental data comprising data representative of a physical item present in the physical environment;
    transmitting, by the computing device and to a service provider terminal, the location data and environmental data;
    activating, by the computing device, a first augmented reality mode configured to enable user selection of one or more items for purchase;
    receiving, at the computing device, virtual content generated and transmitted from the service provider terminal, the virtual content associated with the physical item and the one or more items for purchase, the one or more items for purchase at least in part comprising digital variations of the physical item;

displaying, by the computing device, at least a portion of the virtual content, the virtual content comprising the one or more items for purchase presented as digital alternatives to the physical item;

detecting, by the computing device, a first user input that is representative of a user selection of at least one of the one or more items for purchase to indicate one or more selected items;

responsive to detecting the first user input, activating a second augmented reality mode configured to enable payment for the one or more selected items;

detecting, by the computing device, a second user input that is representative of a user's intent to pay for the one or more selected items; and transmitting, to the service provider terminal, the second user input.

10. The method of claim 9, wherein detection of one of the first user input or the second user input comprises detection of a click gesture, a swipe gesture, a focus gesture, or a step gesture.

11. The method of claim 10, wherein detection of a click gesture comprises detection, by the computing device, of a pointing motion associated with a visual indication of the at least one of the one or more items available for purchase or a payment option.

12. The method of claim 10, wherein detection of a swipe gesture comprises detection, by the computing device, of a swiping motion associated with a visual indication of the at least one of the one or more items available for purchase or a payment option.

13. The method of claim 10, wherein detection of a focus gesture comprises determining that a gaze of a user of the computing device is focused on a visual indication of the at least one of the one or more items available for purchase for longer than a predetermined threshold amount of time.

14. The method of claim 10, wherein detection of a step gesture comprises determining that the computing device or a user of the computing device has transitioned through a predetermined threshold in the physical environment.

15. The method of claim 9, wherein activating the augmented reality functionality is based on an instruction from the service provider terminal, the instruction being sent by the service provider terminal in response to a determination by the service provider terminal that the computing device has entered a predefined merchant location associated with a merchant.

16. The method of claim 9 further comprising:

subsequent to receiving the first user input, activating, by the computing device, a configuration interface configured to enable configuration of the one or more selected items; and detecting, by the computing device, a third user input that is representative of configuration of at least one of the one or more selected items.

17. A method of facilitating an augmented reality experience to purchase an item at a merchant location, the method comprising:

detecting, by a merchant terminal associated with a merchant, that a computing device associated with a user has entered a predefined merchant location associated with the merchant;

responsive to detecting that the computing device has entered the predefined merchant location, directing the computing device to activate a first augmented reality mode configured to enable user selection of one or more items for purchase;

identifying, based at least in part on environmental data received from the computing device, a physical item present in a physical environment;

generating, based at least in part on the identified physical item, virtual content associated with the identified physical item and the one or more items for purchase;

transmitting the virtual content to the computing device for display on a display of the computing device;

receiving an indication of a first user input detected by the computing device, the first user input being associated with selection of at least one of the one or more items for purchase to indicate one or more selected items;

responsive to receiving the indication of the first user input, directing the computing device to activate a second augmented reality mode configured to enable payment for the one or more selected items; and receiving an indication of a second user input detected by the computing device, the second user input being associated with payment for the one or more selected items.

18. The method of claim 17 further comprising:

receiving, from a financial service provider terminal, purchase request data to enable a transaction related to the one or more selected items, wherein the purchase request data comprises user payment credentials.

19. The method of claim 17 further comprising:

subsequent to receiving the first user input, directing the computing device to activate a configuration interface configured to enable configuration of the one or more selected items; and receiving an indication of a third user input detected by the computing device, the third user input being associated with configuration of at least one of the one or more selected items.

20. The method of claim 17 further comprising:

updating, by the merchant terminal and in response to receiving the first user input, a virtual cart with cart information comprising an identification of the one or more selected items and a cumulative cost of the one or more selected items; and transmitting, by the merchant terminal and to the computing device, the cart information for display by the computing device.

* * * * *